(12) United States Patent
Shaffer et al.

(10) Patent No.: US 6,805,108 B2
(45) Date of Patent: Oct. 19, 2004

(54) HEAT EXCHANGER FOR A SUPERCHARGER

(75) Inventors: Bradley J. Shaffer, Romney, IN (US); John R. Gladden, Lafayette, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/323,854

(22) Filed: Dec. 20, 2002

(65) Prior Publication Data

US 2004/0118389 A1 Jun. 24, 2004

(51) Int. Cl.[7] .............................................. F02B 29/04
(52) U.S. Cl. ........................ 123/563; 60/599; 165/51; 165/176; 165/DIG. 472
(58) Field of Search ...................... 123/563; 60/599; 165/51, 176, DIG. 472

(56) References Cited

U.S. PATENT DOCUMENTS

| | | | |
|---|---|---|---|
| 1,891,058 A | * 12/1932 | Smiy | 165/176 |
| 2,241,420 A | 5/1941 | Pinkel | |
| 2,357,156 A | * 8/1944 | Wilson | 165/176 |
| 2,423,697 A | * 7/1947 | Garfield | 165/176 |
| 2,703,560 A | 1/1954 | Lieberherr | |
| 4,069,670 A | * 1/1978 | Bratt et al. | 0165/176 |
| 4,075,991 A | 2/1978 | Mettig et al. | |
| 4,170,107 A | 10/1979 | Horler | |
| 4,269,158 A | 5/1981 | Berti | |
| 4,295,521 A | 10/1981 | Sommars | |
| 4,474,162 A | 10/1984 | Mason | |
| 4,476,842 A | 10/1984 | Belsanti | |
| 4,548,260 A | 10/1985 | Stachura | |
| 4,562,697 A | 1/1986 | Lawson | |
| 4,598,687 A | 7/1986 | Hayashi | |
| 4,660,632 A | 4/1987 | Yampolsky et al. | |
| 4,688,383 A | 8/1987 | Targa Pascual | |
| 4,823,868 A | 4/1989 | Neebel | |
| 5,383,439 A | 1/1995 | Bock | |
| 5,441,106 A | 8/1995 | Yukitake | |
| 5,547,019 A | 8/1996 | Iacullo | |
| 5,797,449 A | 8/1998 | Oswald et al. | |
| 5,871,001 A | 2/1999 | Pelkey | |
| 6,073,616 A | 6/2000 | Hedman | |
| 6,158,398 A | 12/2000 | Betz | |
| 6,158,399 A | 12/2000 | Ash et al. | |
| 6,230,695 B1 | 5/2001 | Coleman et al. | |
| 6,311,676 B1 | 11/2001 | Oberg et al. | |
| 6,318,347 B1 | 11/2001 | Dicke et al. | |

FOREIGN PATENT DOCUMENTS

DE          3439738 A    *  4/1986   .......... F02B/29/04

OTHER PUBLICATIONS

H. Koltz, T. Männle, T. Spägele, "Optimierung des Aufladesystems für einen kompakten, zweistufig hochaufgeladenen Dieselmotor mit einem Leistungsgewicht von 1.1kg/kW", Mar. 30–31, 2000.

* cited by examiner

Primary Examiner—Sheldon J. Richter
(74) Attorney, Agent, or Firm—Finnegan, Henderson, Farabow, Garrett & Dunner

(57) ABSTRACT

A heat exchanger for mounting in a supercharger is provided. The heat exchanger includes a body having a first end and a second end. A water bonnet is connectable with the first end of the body and includes an inlet, an outlet, an inner annulus, and an outer annulus. The inlet may be associated with one of the inner and outer annuluses and the outlet is associated with the other of the inner and outer annuluses.

55 Claims, 4 Drawing Sheets

HEAT EXCHANGER FOR A SUPERCHARGER

TECHNICAL FIELD

The present invention is directed generally to a heat exchanger for a supercharger, and more particularly to a heat exchanger with a water bonnet for coolant circulation.

BACKGROUND

A limiting factor in the performance of an internal combustion engine is the amount of combustion air that can be delivered to the intake manifold for combustion in the engine cylinders. Atmospheric pressure is often inadequate to supply the required amount of air for proper operation of an engine. Therefore, it is common practice to use an auxiliary system to supply additional air to the intake manifold. It is known to supply additional air to the intake manifold through the use of a supercharger, such as, for example, a turbocharger.

A turbocharger supplies combustion air at a higher pressure and higher density than existing atmospheric pressure and ambient density. The use of a turbocharger can compensate for lack of power due, for example, to altitude, or to otherwise increase power that can be obtained from an engine of a given displacement, thereby reducing the cost, weight and size of the engine required for a given power output.

A problem associated with the use of turbochargers is the build up of heat in the compressed air. Heat reduction has been accomplished through the use of external "aftercoolers" or external "intercooler" generically referred to as intercoolers. The build up of heat in a first compressor may decrease the efficiency of a second compressor or efficiency of air induction into the engine intake ports. External intercoolers can be bulky, utilizing additional space in what can be cramped environments around the internal combustion engine.

An intercooler for an internal combustion engine is described in U.S. Pat. No. 6,311,676 issued to Oberg et al. on Nov. 6, 2001. This patent describes an intercooler mounted between a turbocharger and an internal combustion engine. One drawback to this arrangement is that the intercooler is a separate component that requires more space.

The present invention is directed at one or more of the problems described above associated with existing turbochargers and coolers.

SUMMARY OF THE INVENTION

In one aspect of the present invention, a heat exchanger for mounting in a supercharger is provided. The heat exchanger includes a body having a first end and a second end. A water bonnet is connected to the first end of the body and includes an inlet, an outlet, an inner annulus, and an outer annulus. The inlet may be associated with one of the inner and outer annuluses and the outlet is associated with the other of the inner and outer annuluses.

In another aspect of the present invention, a supercharger is provided. The supercharger includes a housing assembly, a rotatable shaft supported in the housing assembly, a first compressor supported on the rotatable shaft, and a heat exchanger. The heat exchanger includes a body having a first end and a second end. The body defines an opening extending from the first end to the second end and the rotatable shaft extends through the opening. A water bonnet is connected to the first end of the body and includes an inlet, an outlet, an inner annulus, and an outer annulus. The inlet may be associated with one of the inner and outer annuluses, and the outlet is associated with the other of the inner and outer annuluses.

In another aspect of the present invention, a method of mounting a heat exchanger in a supercharger is provided. The supercharger includes a housing assembly defining a volute cavity and having at least two through holes. The method includes inserting a first connector through the volute cavity into one of the two through holes, inserting a second connector through the volute cavity into the other of the two through holes, and inserting the heat exchanger into the volute cavity. The heat exchanger includes a body having a first end and a water bonnet is connected to the first end of the body. The water bonnet includes an inner annulus and an outer annulus for coolant flow, an inlet associated with one of the inner and outer annuluses, and an outlet associated with the other of the inner and outer annuluses. The method further includes connecting the first connector to the inlet and connecting the second connector to the outlet.

DETAILED DESCRIPTION

Reference will now be made in detail to the present exemplary embodiment of the invention, which is illustrated in the accompanying drawings.

Figure 1:
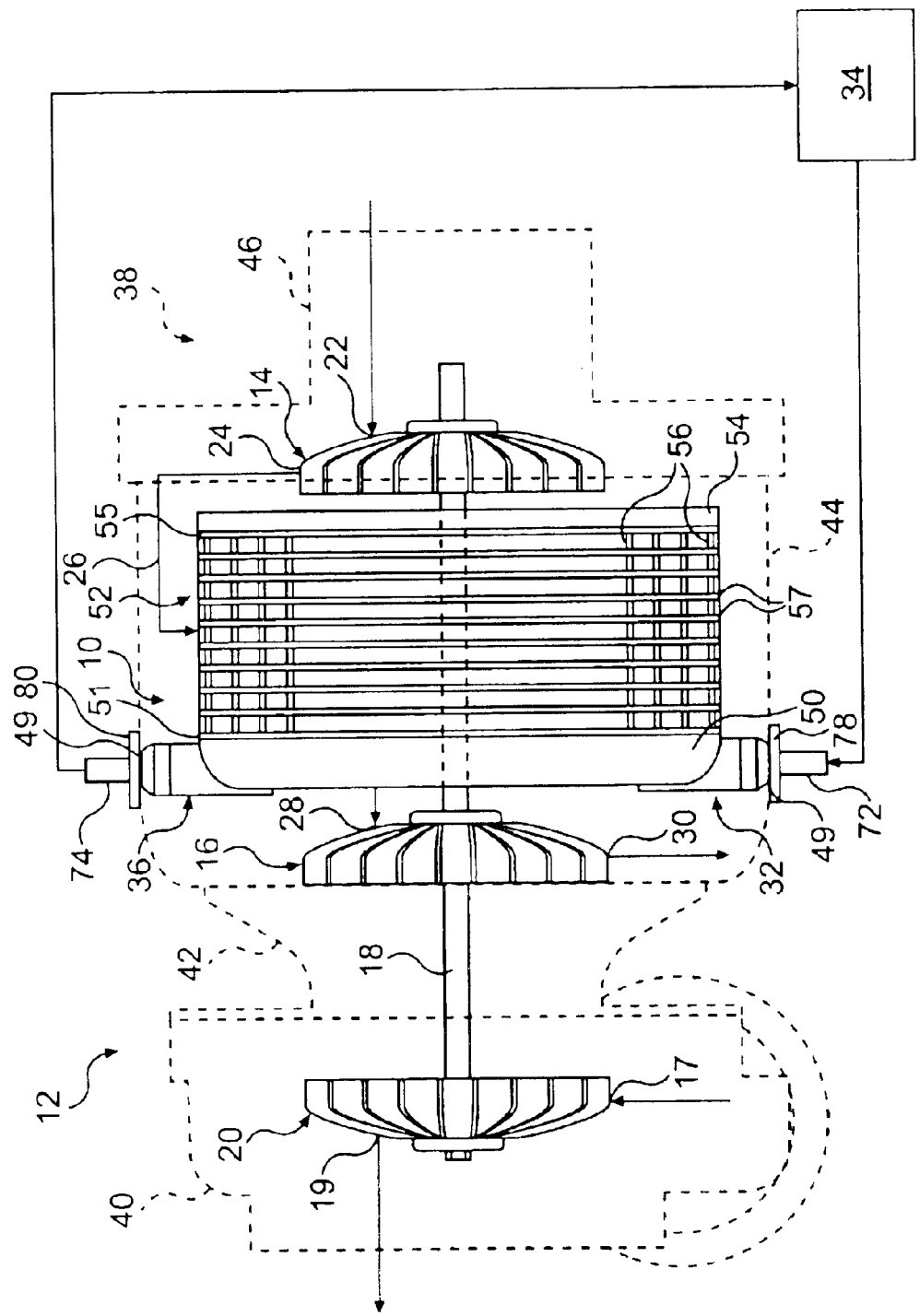
FIG. 1 is a diagrammatic view of a turbocharger including an exemplary heat exchanger of the present invention.

With reference to FIG. 1, a heat exchanger 10 is provided as part of a turbocharger 12. In the embodiment shown, the turbocharger 12 includes first and second compressors 14, 16 connected by a rotatable shaft 18. The first compressor 14 may be a low pressure compressor, and the second compressor 16 may be a high pressure compressor. A turbine 20 connected to the shaft 18 drives rotation of the shaft 18 when placed in communication with exhaust gases from an engine and includes a turbine inlet 17 and a turbine outlet 19.

A first inlet 22 open to ambient air communicates with the first compressor 14. The first inlet 22 may be oriented axially with respect to the compressor 14. A first outlet 24 is in fluid communication with the first compressor 14 and directs compressed air flow towards heat exchanger 10 through an internal flow path 26. The first outlet 24 may be oriented radially with respect to the first compressor 14.

The internal flow path 26 directs the compressed air flow through heat exchanger 10 placing it in fluid communication with a second inlet 28. The second inlet 28 is in fluid communication with the second compressor 16 and may be oriented axially with respect thereto. A second outlet 30 is in fluid communication with the second compressor 16 and may be oriented radially with respect thereto. The second outlet 30 directs the compressed air to an engine's manifold system.

An inlet 32 for the heat exchanger 10 is in fluid communication with a coolant supply system 34. The inlet 32 may be oriented radially with respect to the heat exchanger 10. An outlet 36 for the heat exchanger 10 is in fluid communication with the coolant supply system 34. The outlet 36 may be oriented radially with respect to the heat exchanger 10. The coolant supply system may be any conventional system, having a heat exchanger, fans, pumps and the like. The coolant supply system 34 may be a separate, dedicated system for the heat exchanger 10, or may be part of a cooling system for the engine.

The turbocharger 12 includes a housing assembly 38 that includes a first section 40 to primarily contain the turbine 20, a second section 42 to primarily support the shaft 18, a third section 44, commonly referred to as a volute section, that primarily contains the second compressor 16 and heat exchanger 10, and a fourth section 46 that primarily contains the first compressor 14. A plurality of through holes 49 are also formed in the third section 44.

Figure 2:
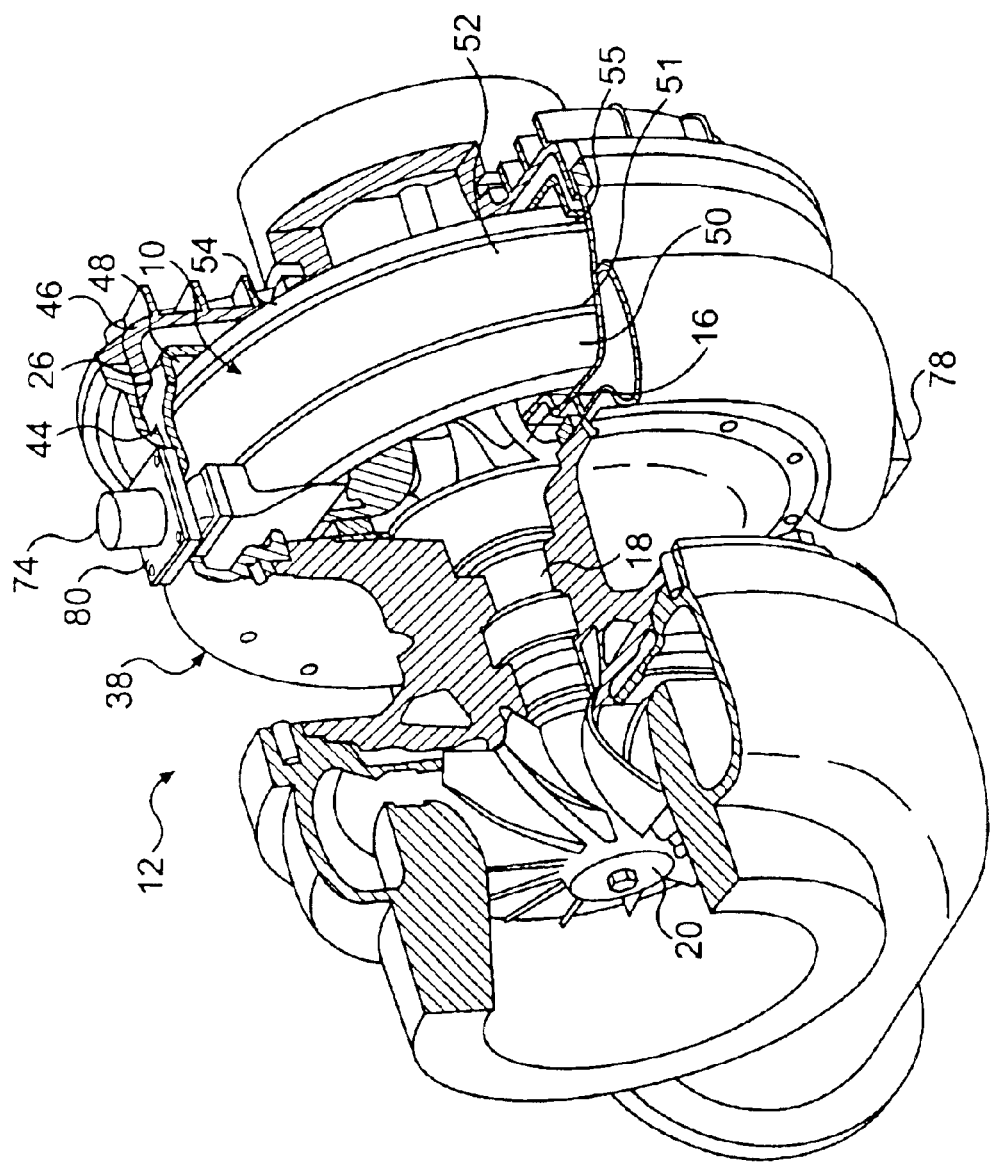
FIG. 2 is a partial sectional view of an exemplary embodiment of the turbocharger of FIG. 1.

FIG. 2 shows one exemplary embodiment of the turbocharger 12 with a quarter section of the housing assembly 38 removed to expose the turbine 20, shaft 18, second compressor 16, and heat exchanger 10 inside the housing assembly 38. The first compressor 14 is hidden from view by the heat exchanger 10. The internal flow path 26 between the first compressor 14 and the heat exchanger 10 is defined by both the third and fourth sections 44, 46. The internal flow path 26 opens into a volute cavity 48 in which the heat exchanger 10 is located. The heat exchanger 10 is mounted in the volute cavity 48 and supported by any conventional means, such as, for example, by connection to the housing assembly 38.

As seen in FIGS. 1 and 2, the heat exchanger 10 includes a first water bonnet 50, a substantially cylindrical body 52 defining an opening extending through the cylindrical body 52, and a second water bonnet 54. The cylindrical body 52 is a heat exchanger core, for example, a tube-fin type arrangement (best seen in FIG. 1). The cylindrical body 52 may include a plurality of tubes 56 extending between a first end plate 51 and a second end plate 55. The cylindrical body 52 may also include a plurality of substantially circular fins 57 having a central hole defining the opening for the shaft 18 supported on the plurality of tubes 56. The plurality of tubes and fins are shown as generally located around shaft 18. The actual number of tubes and fins may vary as one of ordinary skill in the art would appreciate. Each of the first and second water bonnets 50, 54 are attached to first and second end plates 51, 55, respectively, and the shaft 18 extends through the opening of the body 52.

In one exemplary embodiment, the plurality of tubes 56 may be copper or aluminum or any other material having similar thermal and mechanical properties such as thermal conductivity, thermal expansion, strength and corrosion resistance, while the circular fins 57 are formed from aluminum or materials having similar mechanical and thermal properties. The end plates 51, 55 may be made out of materials having similar properties as the material for the tubes 56 to ensure proper connection. The first and second water bonnets 50, 54 may be made of cast steel or other suitable materials.

Figure 3:
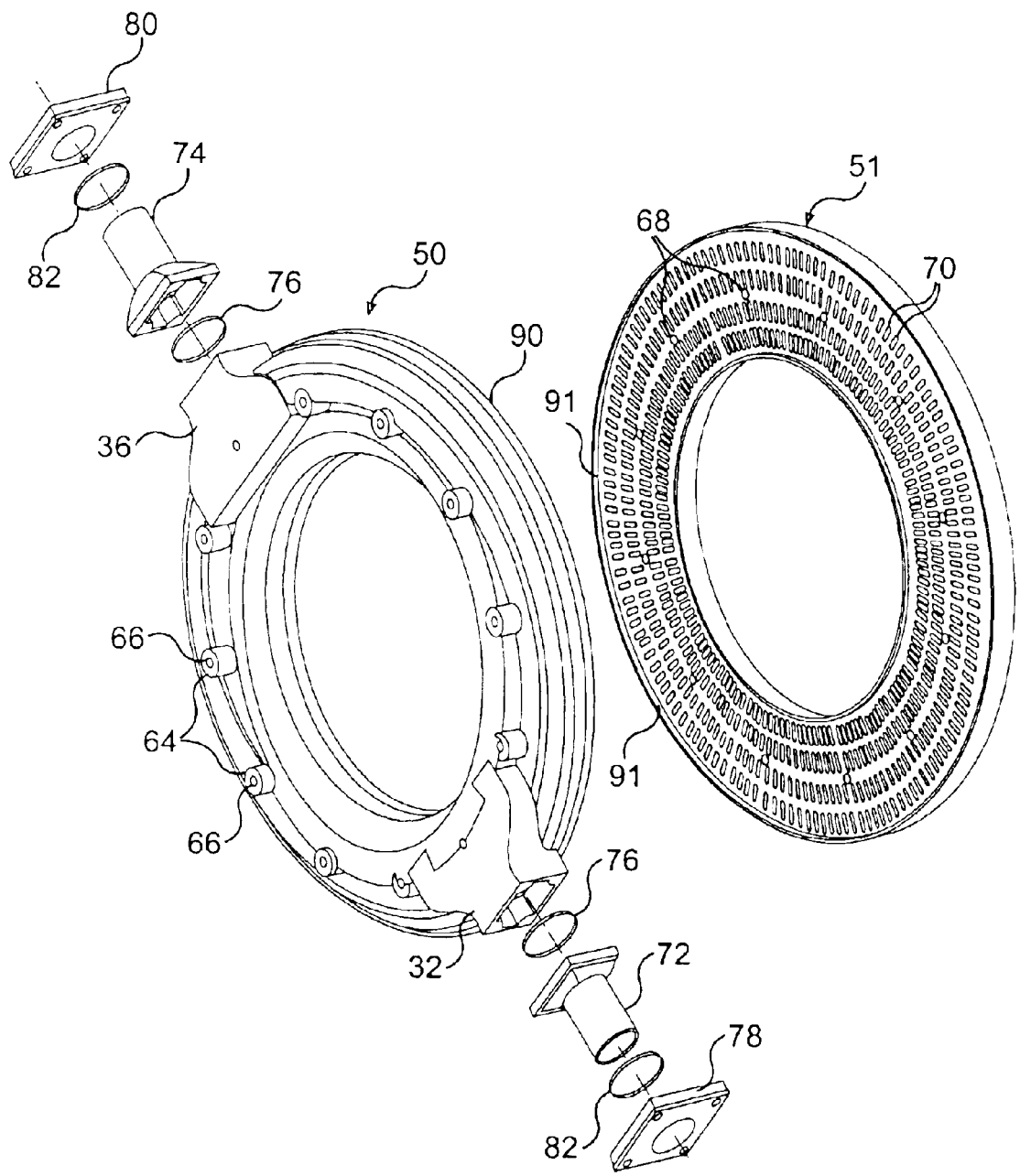
FIG. 3 is an exploded perspective view of an exemplary embodiment of the heat exchanger of FIG. 2.
Figure 4:
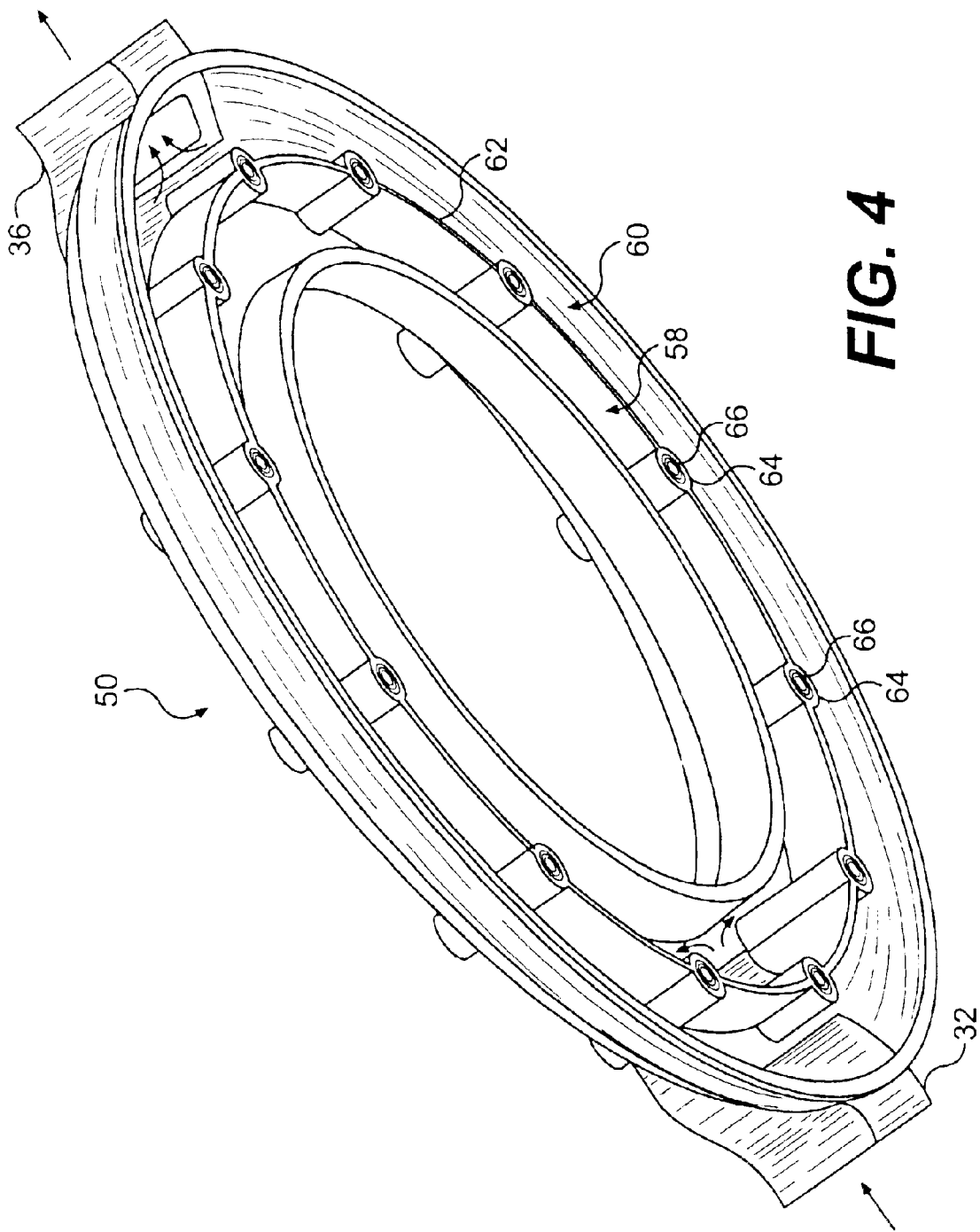
FIG. 4 is a perspective view of the water bonnet of the heat exchanger of FIG. 3.

FIGS. 3 and 4 show one exemplary embodiment of the first water bonnet 50 and first end plate 51 (shown in FIG. 3). The first water bonnet 50 includes at least an inner and outer annulus 58, 60 (best seen in FIG. 4). The inlet 32 is in fluid communication with the inner annulus 58 and the outer annulus 60 is in fluid communication with the outlet 36, although, it is understood that this arrangement could be reversed without departing from the invention. An internal wall 62 separates the inner annulus 58 from the outer annulus 60 and includes a plurality of bosses 64. Each boss 64 includes a through hole 66 for receiving a fastener (not shown) to attach the first water bonnet 50 to the first end plate 51.

The first end plate 51 includes a plurality of holes 68 that align with corresponding through holes 66 on the first water bonnet 50. Each hole 68 may be configured to receive, for example, a threaded bolt, a stud, or a rivet. By using this fastening arrangement, a uniform force distribution may be applied to seal the first water bonnet 50 to the first end plate 51. Seals or gaskets may also be provided to further seal the bosses 64 and the inner and outer sides of the first water bonnet 50. Alternatively, the first water bonnet 50 may be secured to the first end plate 51 by, for example, welding, soldering, brazing, adhesive or by providing threads on an outer periphery 90 of the water bonnet 50 that cooperate with corresponding threads on a raised lip 91 of the end plate 51.

The first end plate 51 also includes a plurality of tube openings 70 configured to receive the ends of the plurality of tubes 56 (not shown for clarity). Each of the tubes 56 may be attached to the first end plate 51 by brazing or other suitable means. Both inner and outer annuluses 58, 60 are in fluid communication with the plurality of tube openings 70 formed in the first end plate 51 to allow coolant to flow through the first end plate 51 into the plurality of tubes 56 of the heat exchanger 10. In this embodiment, the tube openings 70 are configured to receive crushed tubes, which allow for a greater number of tubes to be included in the heat exchanger 10. However, the invention is not limited to only crushed tubes as one skilled in the art will appreciate that alternative shaped tubes may be utilized. It should be appreciated that the number of tube openings 70 and holes 68 may vary without departing from the scope of the invention. It should also be appreciated that other cores such as, for example, a bar-plate core may also work.

In the exemplary embodiment, the inner annulus 58 may have a greater height at the inlet 32 than at a location near the outlet 36, and the outer annulus 60 may have a greater height at the outlet 36 than at a location near the inlet 32. This arrangement may assist in providing a uniform flow of coolant to the plurality of tubes 56 of the heat exchanger 10. The cross-section of each annulus may also vary between the inlet 32 and outlet 36 to further control the flow of coolant into the plurality of tubes 56.

With reference to FIG. 3, first and second connectors 72, 74 are attached to inlet 32 and outlet 36, respectively, by fastening means (not shown). The first and second connectors are in fluid communication with their respective inlet 32 and outlet 36. The first and second connectors 72, 74 are also in fluid communication with the coolant supply system 34 (as seen in FIG. 1). A seal 76 may be arranged between each of the first and second connectors 72, 74 and the respective inlet 32 and outlet 36. The first and second connectors may be any suitable connectors, such as, for example, thin-walled tubes, flexible metal bellows, and elastomeric tubes with or without a metallic shield. The type of connector chosen may be selected based on the amount of axial and radial displacement that is desirable for the connection.

First and second connector plates 78, 80 fit over the first and second connectors 72, 74, respectively and attach to the housing assembly 38 (shown in FIG. 2) via fastening means (not shown) to seal the through holes 49 in the housing assembly 38. A seal 82 may be arranged between each of the first and second connector plates 78, 80 and the housing assembly 38. The seals 76, 82 may be any suitable type of seal, such as, for example, an o-ring seal or gasket.

Industrial Applicability

In use, coolant from coolant supply source 34 is pumped to inlet 32 of the first water bonnet. The coolant may be water, oil, air, glycol, or other fluid useful for receiving heat from a hot compressed air stream. Coolant is distributed to the cylindrical body 52 of the heat exchanger through the first water bonnet 50. The coolant flows into the inner annulus 58 and through those inner located tubes 56 in fluid communication with the first inner annulus to the second water bonnet 54, which may be any conventional return bonnet. The coolant will generally flow outwards in the second water bonnet to the outer located tubes 56, which are in fluid communication with the outer annulus 60. The coolant will flow out of the outer annulus 60 through the outlet 36 to the coolant supply system 34.

Ambient air enters turbocharger 12 through first inlet 22. The air is compressed by the first compressor 14 and flows out of the first outlet 24 into the interior flow path 26. The flow of compressed air continues through the interior flow path 26 across the plurality of fins 57 and plurality of tubes 56. Heat is removed from the compressed air and transferred to the coolant via the fins 57 and tubes 56. The compressed air enters into the second inlet 28 of the second compressor 16 where it is further compressed. The compressed air then flows through the second outlet 30 to an engine manifold system for the internal combustion engine. It should be understood that air may also include a mixture of air/fuel, such as, for example, air/natural gas.

By means of example only, the coolant may be a 50/50 mixture of water and extended life coolant supplied from the coolant supply system 34 at approximately 32° C. The temperature of the air or air/fuel mixture may be approximately 127° C. prior to the heat exchanger 10 and 45° C. after the heat exchanger 10. It is understood that modifications in temperature can be accomplished by varying the number of tubes, fins, and/or coolant temperature and all fall within the scope of the invention.

The heat exchanger 10 is easily mounted inside the turbocharger 12. Once the turbocharger is partially assembled so that the second compressor 16 is mounted on the shaft 18 in the housing assembly 38, the first and second connectors 72, 74 can be inserted in the volute cavity 48 into two of the through holes 49. Next, the heat exchanger 10 is inserted in the volute cavity 48 along the shaft 18 wherein the first connector 72 is connected to the inlet 32 and the second connector 74 is connected to the outlet 36. This may be accomplished by extending fastening means through the through holes 49 and fastening the connectors to the inlet and outlet. Finally, first and second connecting plates 78, 80 are positioned over first and second connectors 72, 74, respectively, and fastened to the third section 44 of the housing assembly 38. After mounting the heat exchanger 10 in the housing assembly 38, the first compressor wheel may then be mounted to the shaft 18. For maintenance and service of the heat exchanger 10, the above method can be reversed.

Alternatively, if threads are provided on the first water bonnet 50 and first end plate 51, the method of maintenance and service may be modified. For example, if it is necessary to replace the cylindrical body 52 it may be unthreaded from the first water bonnet 50 leaving the first water bonnet 50 in place in the turbocharger 12.

While the invention has been shown on a turbocharger 12 having a heat exchanger 10 arranged between first and second compressors 14, 16, it can also be incorporated on superchargers or other turbochargers having one or more compressors. For example, the heat exchanger 10 may be used as an aftercooler between an outlet leading to an engine manifold system and a single compressor. While shown for a turbocharger 10 having compressors oriented in the same direction, the heat exchanger 10 may be located between compressors oriented back to back. In addition, while the third section 44 of the housing assembly 38 is described as having at least two through holes 49, more through holes may be provided to allow for the third section 44 to be rotated based on preferred orientation of the second outlet 30 of the second compressor 16. This allows the inlet 32 and outlet 36 to remain in a substantially vertical orientation, although the inlet 32 and outlet 36 are not limited to this orientation.

The disclosed heat exchanger provides effective cooling of air between a first compressor and a second compressor. By cooling the air between compressors, overall compressor efficiency is increased because heat in the compressed air is removed thereby allowing for a greater volume of compressed air. By locating the heat exchanger inside the turbocharger, space requirements for the entire system are reduced with no adverse effect on air flow between the compressors. With a smaller space requirement, the heat exchanger can be utilized with a greater variety of engines compared to a heat exchanger with external coolers, which require a larger space requirement.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A heat exchanger for mounting in a supercharger, the heat exchanger comprising:
    a body having a first end, a second end, a first end plate, and a second end plate; and
    a water bonnet connectable with said first end of said body, said water bonnet including an inlet, an outlet, an inner annulus, and an outer annulus, said inlet being associated with one of said inner and outer annuluses, said outlet being associated with the other of said inner and outer annuluses.

2. The heat exchanger according to claim 1, wherein said inlet is associated with said inner annulus.

3. The heat exchanger according to claim 1, further including a second water bonnet connectable with said second end of said body.

4. The heat exchanger according to claim 1, further including a first connector connectable with said water bonnet inlet and a second connector connectable with said water bonnet outlet, wherein each of said first and second connectors allows coolant flow through said water bonnet.

5. The heat exchanger according to claim 4, wherein each of the first and second connectors are selected from one of a thin-walled tube, a flexible metal bellow, and an elastomeric tube.

6. The heat exchanger according to claim 1, wherein said body includes a plurality of tubes extending between said first end plate and said second end plate.

7. The heat exchanger according to claim 6, further including means for attaching said water bonnet to said first end plate.

8. The heat exchanger according claim 7, wherein said means includes a plurality of through holes in said water bonnet and a plurality of holes in said first end plate aligned with said through holes of said water bonnet.

9. The heat exchanger according to claim 8, wherein said water bonnet includes an interior wall dividing said first annulus from said second annulus and each of said plurality of through holes is formed in a boss formed in said interior wall.

10. A supercharger comprising:
a housing assembly;
a rotatable shaft supported in said housing assembly;
a first compressor supported on said rotatable shaft; and
a heat exchanger including
a body having a first end and a second end, said body defining an opening extending from said first end to said second end and said rotatable shaft extending through said opening, and
a water bonnet connectable with said first end of said body, said water bonnet including an inlet, an outlet, an inner annulus, and an outer annulus, said inlet being associated with one of said inner and outer annuluses, said outlet being associated with the other of said inner and outer annuluses.

11. The supercharger according to claim 11, further including a second compressor supported on said rotatable shaft, said heat exchanger being located between said first compressor and said second compressor.

12. The supercharger according to claim 10, further including a turbine supported on said rotatable shaft.

13. The heat exchanger according to claim 10, wherein each of the first and second connectors are selected from one of a thin-walled tube, a flexible metal bellow, and an elastomeric tube.

14. The supercharger according to claim 10, wherein the heat exchanger further includes a second water bonnet connectable with said second end of said body.

15. The supercharger according to claim 10, wherein the body is removably mounted in the supercharger by disconnecting the body from the water bonnet while the water bonnet remains in the supercharger.

16. The supercharger according to claim 10, wherein said body includes first and second end plates, a plurality of tubes extending between said first and second end plates, and a plurality of fins supported by said plurality of tubes.

17. The supercharger according to claim 16, wherein said housing assembly defines a flow path to allow gas to flow across said plurality of fins after being compressed by said compressor.

18. The supercharger according to claim 10, further including a first connector connectable with said water bonnet inlet and a second connector connectable with said water bonnet outlet, wherein each of said first and second connectors allows coolant to flow through said housing assembly to said water bonnet.

19. The supercharger according to claim 18, wherein said housing assembly includes a section having at least two through holes, said first connector extending through one of said at least two through holes and said second connector extending through the other of said at least two through holes.

20. The supercharger according to claim 19, wherein said first connector and said second connector are arranged diametrically opposite each other.

21. A method of mounting a heat exchanger in a supercharger including a housing assembly defining a volute cavity, the housing assembly having at least two through holes, the method comprising:
inserting a first connector through the volute cavity into one of the two through holes;
inserting a second connector through the volute cavity into the other of the two through holes;
inserting the heat exchanger into the volute cavity, the heat exchanger including
a body having a first end;
a water bonnet connectable to said first end of said body, said water bonnet including an inner annulus, an outer annulus, an inlet associated with one of said inner and outer annuluses, and an outlet associated with the other of said inner and outer annuluses; and
connecting said first connector to said inlet; and
connecting said second connector to said outlet.

22. The method according to claim 21, further including inserting a seal between said first connector and said inlet and inserting a seal between said second connector and said outlet.

23. The method according to claim 21, wherein the body is removably mounted in the supercharger by disconnecting the body from the water bonnet while the water bonnet remains in the turbocharger.

24. The method according to claim 21 further including positioning a first connector plate over said first connector and a second connector plate over said second connector.

25. The method according to claim 24, further including fastening said first and second connector plates to said housing assembly.

26. The method according to claim 25, further including inserting a seal between said first connector plate and said housing and inserting a seal between said second connector plate and said housing.

27. A heat exchanger for mounting in a supercharger, the heat exchanger comprising:
a body having a first end and a second end;
a first water bonnet connectable with said first end of said body, said first water bonnet including an inlet, an outlet, an inner annulus, and an outer annulus, said inlet being associated with one of said inner and outer annuluses, said outlet being associated with the other of said inner and outer annuluses; and
a second water bonnet connectable with said second end of said body.

28. The heat exchanger according to claim 27, wherein said inlet is associated with said inner annulus.

29. The heat exchanger according to claim 27, further including a first connector connectable with said water bonnet inlet and a second connector connectable with said water bonnet outlet, wherein each of said first and second connectors allows coolant flow through said water bonnet.

30. The heat exchanger according to claim 29, wherein each of the first and second connectors are selected from one of a thin-walled tube, a flexible metal bellow, and an elastomeric tube.

31. The heat exchanger according to claim 27, wherein said body includes a first end plate and a second end plate.

32. The heat exchanger according to claim 31, wherein said body includes a plurality of tubes extending between said first end plate and said second end plate.

33. The heat exchanger according to claim 32, further including means for attaching said water bonnet to said first end plate.

34. The heat exchanger according to claim 33, wherein said means includes a plurality of through holes in said water bonnet and a plurality of holes in said first end plate aligned with said through holes of said water bonnet.

35. The heat exchanger according to claim 34, wherein said water bonnet includes an interior wall dividing said first annulus from said second annulus and each of said plurality of through holes is formed in a boss formed in said interior wall.

36. A heat exchanger for mounting in a supercharger, the heat exchanger comprising:
a body having a first end, a second end, and an axial direction between the first and second ends, the body being configured to receive an air flow entering the body radially between the first and second ends and exiting the body through the first end in the axial direction; and
a water bonnet connectable with said first end of said body, said water bonnet including an inlet, an outlet, an inner annulus, and an outer annulus, said inlet being associated with one of said inner and outer annuluses, said outlet being associated with the other of said inner and outer annuluses.

37. The heat exchanger according to claim 36, wherein said inlet is associated with said inner annulus.

38. The heat exchanger according to claim 36, further including a second water bonnet connectable with said second end of said body.

39. The heat exchanger according to claim 36, further including a first connector connectable with said water bonnet inlet and a second connector connectable with said water bonnet outlet, wherein each of said first and second connectors allows coolant flow through said water bonnet.

40. The heat exchanger according to claim 39, wherein each of the first and second connectors are selected from one of a thin-walled tube, a flexible metal bellow, and an elastomeric tube.

41. The heat exchanger according to claim 36, wherein said body includes a first end plate and a second end plate.

42. The heat exchanger according to claim 41, wherein said body includes a plurality of tubes extending between said first end plate and said second end plate.

43. The heat exchanger according to claim 42, further including means for attaching said water bonnet to said first end plate.

44. The heat exchanger according to claim 43, wherein said means includes a plurality of through holes in said water bonnet and a plurality of holes in said first end plate aligned with said through holes of said water bonnet.

45. The heat exchanger according to claim 44, wherein said water bonnet includes an interior wall dividing said first annulus from said second annulus and each of said plurality of through holes is formed in a boss formed in said interior wall.

46. A heat exchanger for mounting in a supercharger, the heat exchanger comprising:
a body having a first end and a second end;
a plurality of annular fins disposed around an outer periphery of the body; and
a water bonnet connectable with said first end of said body, said water bonnet including an inlet, an outlet, an inner annulus, and an outer annulus, said inlet being associated with one of said inner and outer annuluses, said outlet being associated with the other of said inner and outer annuluses.

47. The heat exchanger according to claim 46, wherein said inlet is associated with said inner annulus.

48. The heat exchanger according to claim 46 further including a second water bonnet connectable with said second end of said body.

49. The heat exchanger according to claim 46, further including a first connector connectable with said water bonnet inlet and a second connector connectable with said water bonnet outlet, wherein each of said first and second connectors allows coolant flow through said water bonnet.

50. The heat exchanger according to claim 49, wherein each of the first and second connectors are selected from one of a thin-walled tube, a flexible metal bellow, and an elastomeric tube.

51. The heat exchanger according to claim 46, wherein said body includes a first end plate and a second end plate.

52. The heat exchanger according to claim 51, wherein said body includes a plurality of tubes extending between said first end plate and said second end plate.

53. The heat exchanger according to claim 52, further including means for attaching said water bonnet to said first end plate.

54. The heat exchanger according to claim 53, wherein said means includes a plurality of through holes in said water bonnet and a plurality of holes in said first end plate aligned with said through holes of said water bonnet.

55. The heat exchanger according to claim 54, wherein said water bonnet includes an interior wall dividing said first annulus from said second annulus and each of said plurality of through holes is formed in a boss formed in said interior wall.

* * * * *